Oct. 24, 1967     E. R. BUCKLES     3,348,860
TRAILER WITH STEERABLE WHEELED PROP
Filed Sept. 3, 1965     2 Sheets-Sheet 1
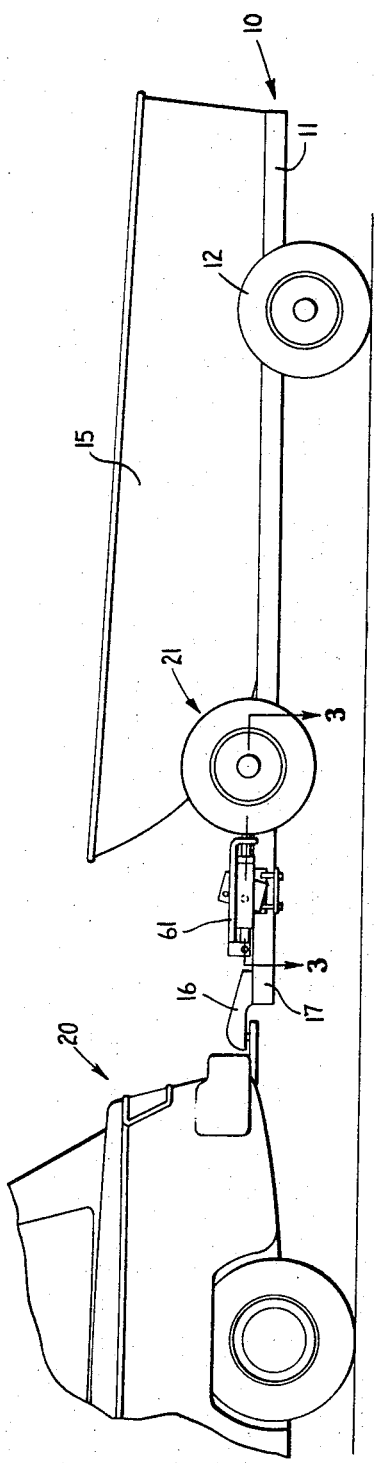
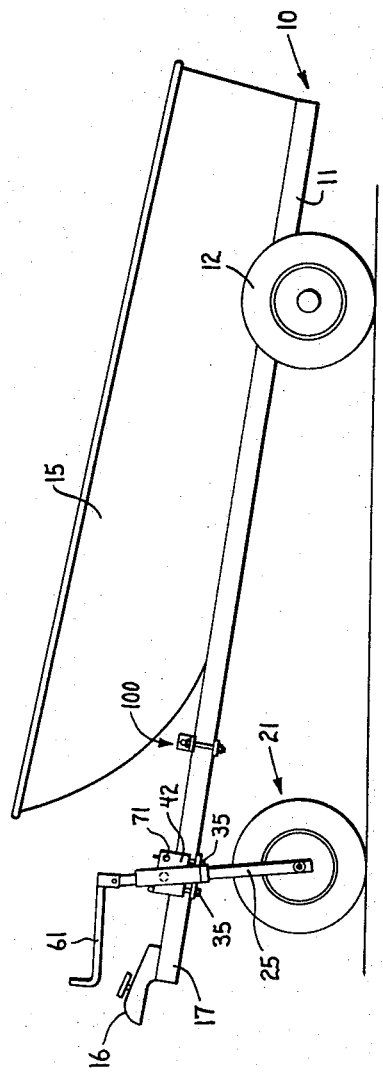
INVENTOR
ELDON R. BUCKLES
BY Lockwood, Woodard, Smith & Weikart
Attorneys Oct. 24, 1967  E. R. BUCKLES  3,348,860
TRAILER WITH STEERABLE WHEELED PROP
Filed Sept. 3, 1965  2 Sheets-Sheet 2

INVENTOR.
ELDON R. BUCKLES
BY *Lockwood, Woodard, Smith & Weikart*
Attorneys

United States Patent Office 3,348,860
Patented Oct. 24, 1967

3,348,860
TRAILER WITH STEERABLE WHEELED PROP
Eldon R. Buckles, R.R. 7, Box 508,
Terre Haute, Ind. 47805
Filed Sept. 3, 1965, Ser. No. 484,927
3 Claims. (Cl. 280—475)

The present invention relates to trailers and more particularly to a trailer which is adapted for carrying a boat.

The launching of boats from trailers and also the loading of boats onto trailers has presented many problems and difficulties. When moving the boat around near the waterway or elsewhere, it is desirable to have three point support and to have a means for steering the trailer. The provision of three point support makes unnecessary the exertion of substantial lifting force on the trailer while moving it from place to place. When the trailer is being pulled on the road, however, it is best to provide only two point support with the weight forward of the support and the forward portion of the trailer coupled to the prime mover. It is, therefore, one object of the present invention to provide a boat trailer arrangement which can be easily converted by one person from two point to three point or from three point to two point support.

Another object of the invention is to provide an improved trailer arrangement.

Still another object of the invention is to provide a trailer arrangement capable of being easily maneuvered from place to place when not connected to a prime mover such as an auto or truck.

Related objects and advantages will become apparent as the description proceeds.

One embodiment of the present invention might include a boat trailer arrangement comprising a frame, a pair of wheels mounted on opposite sides of the rear of said frame, a further wheel, a tubular element swingably secured to said frame toward the forward end thereof, means rotatably mounting said further wheel at one end thereof and extending through said tubular element, means for rotating said rod means in said tubular element for turning said further wheel in said tubular element, means locking said tubular element in a generally upright position, bearing means adjustably fixed on said rod at one of various positions spaced from said axle and bearing against said tubular element for supporting said tubular element and frame while permitting said further wheel to be steered relative to said frame, and means operable when said locking means is unlocked for locking said further wheel to said frame in a raised position.

The full nature of the invention will be understood from the accompanying drawings and the following description and claims.

FIG. 1 is a side elevation of the boat trailer arrangement of the present invention showing the trailer hitched to an automobile.

FIG. 2 is a view similar to FIG. 1 but showing the trailer unhitched and with the auxiliary wheel in an operative position.

Figure 5:
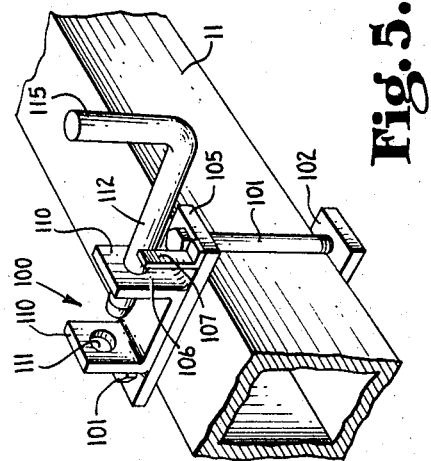
FIG. 5 is a fragmentary view of the means for locking the wheel in the position of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a boat trailer 10 including a frame 11 and a pair of wheels 12 of the same size and rotatably mounted on opposite sides of the rear portion of the frame 11. Supported upon the trailer 10 is a boat 15. A trailer hitch 16 conventional in design is fixedly mounted on the forward portion 17 of the trailer 10. It can be appreciated that the wheels 12 are so mounted on the trailer that the weight or center of gravity of the trailer and the boat 15 are forward of the wheels 12 so that a portion of the weight is supported by the automobile 20 through the trailer hitch 16.

Figure 3:
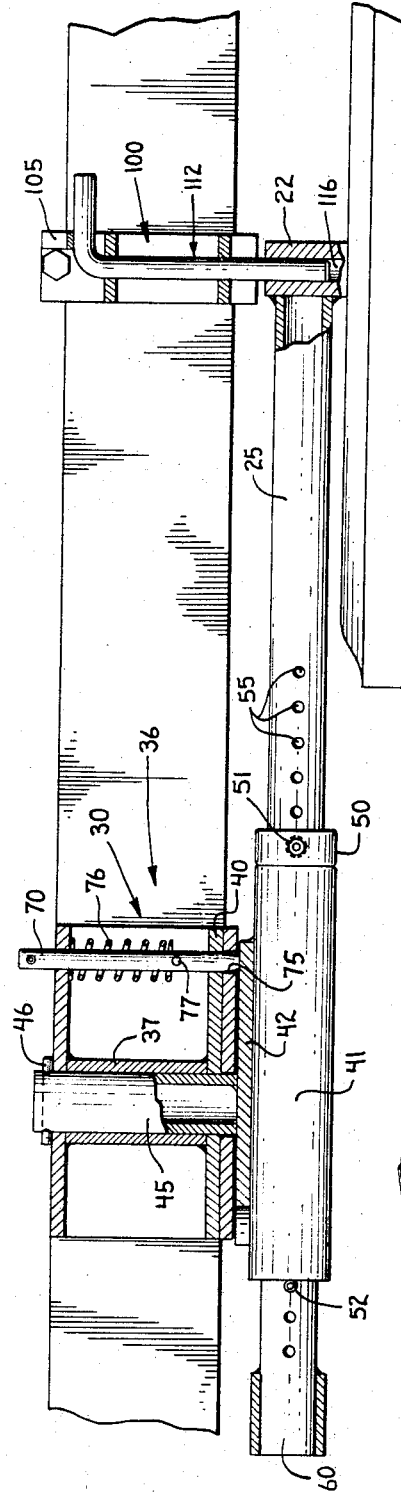
FIG. 3 is an enlarged vertical section taken along the line 3—3 of FIG. 1 in the direction of the arrows.
Figure 4:
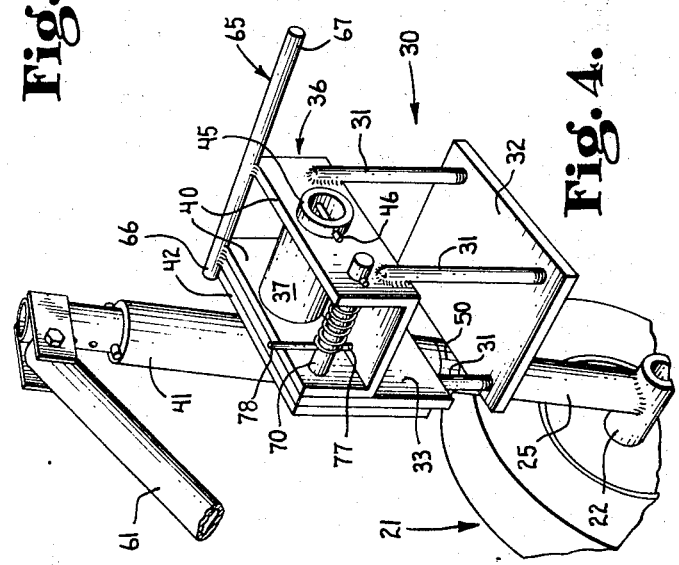
FIG. 4 is a perspective view of the auxiliary wheel showing the wheel in the same position as FIG. 2.

At the forward portion 17 of the trailer 10, there is mounted a further wheel 21 which is the same size as the wheels 12. The wheel 21 is rotatably mounted upon an axle 22 which is fixed to a rod or elongated member 25 which extends perpendicularly of the axle 22. A mounting element 30, best shown in FIGS. 3 and 4 is fixedly mounted on the forward portion 17 of the frame by means of a clamping arrangement including four threaded members 31, a plate 32 received upon the threaded members 31 and nuts 35. Two of the threaded members 31 are each fixed to a channel 36 which has suitable bearing means 37 fixedly mounted between the two legs 40 thereof. The other two threaded members 31 are fixed to a plate 33 which also forms a part of the mounting element 30 and is fixed to the channel 36.

A tubular element 41 is fixed to a plate 42 which is in turn fixed to a cylindrical member 45 rotatably received within the bearing 37. Suitable cotter pin means 46 retains the cylindrical member 45 within the bearing 37. The rod 25 is adjustably secured within the tubular element 41 by means of a collar 50, a bolt 51 extending through the collar, a pin 52 and a plurality of equally spaced apertures 55 in the rod 25. It can be appreciated that when the wheel 21 is in the downward position of FIG. 2 wherein the rod 25 is generally upright, the collar 50, being secured to the rod 25 by the bolt 51, exerts an upward supporting force on the tubular element 41 and thereby supports the forward end of the frame 11 as in FIG. 2. The pin 52 functions to retain the tubular element 41 generally in contact with the collar 50 so that the position of the rod 25 and tubular element 41 remains relatively the same with respect to one another.

Pivotally secured to the end 60 of the rod 25 is a lever 61. The lever 61 can be grasped manually for steering the boat trailer when it is being moved manually in the position of FIG. 2. Alternatively, the lever 61 may be placed in the folded position illustrated in FIG. 1.

Mounted upon the mounting element 30 and on the legs 40 of the channel 46 is a rod or elongated member 65 which has two end portions 66 and 67 extending beyond the sides 40 of the channel and beyond the plate 33 in the case of the end 66. The function of the end 66 is to serve as a stop for the plate 42 when the wheel 21 is swung downwardly from the position of FIG. 1 to the position of FIG. 2. Thus the plate 42 engages the stop portion 66 preventing the rod 25 from moving past the generally upright position of FIG. 2 wherein the wheel 21 is positioned below and to the rear of the pivotal mounting of the cylindrical member 45. When the plate 42 reaches the downward position of FIGS. 2 and 4, a spring pressed plunger 70 projects through one leg 40 and the plate 33 into an aperture 71 in the plate 42, thus locking the wheel in the position of FIG. 2. The spring pressed plunger 70 is reciprocally mounted on the channel 36 so as to be movable in a horizontal direction and is also reciprocal through an aperture 75 in the plate 33. The spring 76 is received about the plunger 70 and acts between one leg 40 and a pin 77 extending through the plunger 70. The pin 77 has a long upwardly extending projection 78 which can be grasped by the operator in order to retract the plunger 70 from the aperture 71 for moving the wheel 21 back to the upward position of FIG. 1. The projecting end 67 of the member 65 serves as a handle for lifting the forward portion of the frame 11.

There is illustrated in FIG. 5, means for locking the wheel 21 in the upward position of FIG. 1. This means includes a mounting element 100 which is clamped to the frame 11 by bolts 101 and a plate 102. Welded to the plate 105 of the mounting element 100 is a channel 106 and an angle 107. The legs 110 of the channel 106 have apertures 111 through which the pin 112 reciprocates. The pin 112 can be withdrawn by means of the handle 115 to the position illustrated in FIG. 5 to permit the wheel 21 to be lowered and the pin can be projected and the handle 115 dropped between the channel 110 and projection 107 as illustrated in FIG. 3 for locking the wheel 21 in an upward position. When the pin 112 is projected as in FIG. 3, it is inserted into the axle 22 which has a hollow interior 116 for holding the wheel in an upward position. Of course, the fact that the bolts 101 are provided and permit adjustable positioning of the mounting element 100 makes possible adjustment of the position of the mounting element 100 for operation of the present device when the bolt and pin 50 and 52, respectively, are positioned in different apertures 55 for changing the relative positions of the wheel 21 and the trailer 10 when the wheel is in the downward position of FIG. 2.

It will be evident from the above description that the present invention provides a trailer arrangement which can be easily converted by one person from two point support to three point support. This is accomplished by the person lifting the forward end of the trailer by the handle 65 and by withdrawing the pin 112 so that the wheel 21 drops into the position of FIG. 2. The plunger 70 is then automatically projected as the plate 42 is stopped by the projection 66. Raising of the wheel 21 is also relatively easy and can be accomplished while the forward end of the trailer is supported by the trailer hitch 16 on the automobile 20. It will also be evident from the above description that the trailer arrangement of the present invention is easily maneuvered by one person from place to place when the hitch is not connected to the automobile.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:
1. A trailer arrangement comprising a frame, a pair of wheels of the same size mounted on opposite sides of the rear of said frame, a further wheel of the same size as said wheels, an axle rotatably mounting said further wheel, a tubular element swingably secured to said frame toward the forward end thereof, a rod fixed at one end to said axle in perpendicular relation thereto and extending through said tubular element, a lever swingably connected to the other end of said rod for turning said further wheel in said tubular element, means locking said tubular element in a generally upright position but with said wheel positioned downwardly and to the rear of the swingable connection of said tubular element and frame, a collar adjustably fixed on said rod at one of various positions spaced from said axle, said collar bearing against said tubular element for supporting said tubular element and frame while permitting said further wheel to be steered relative to said frame, and means operable when said locking means is unlocked for locking said axle to said frame with said further wheel to the rear of said connection of said frame and tubular element.

2. The trailer arrangement of claim 1 wherein said means for locking said tubular element in an upright position comprises a plate fixed to said tubular element, a mounting element secured to said frame at the forward positon thereof and providing said swingable securement for said tubular element, an elongated member secured to said mounting element and having a pair of opposite end portions projecting beyond opposite sides of said mounting element, one of said opposite end portions serving as a handle for lifting the forward portion of said boat trailer, the other of said opposite end portions being positioned in the path of said plate and positioned to stop rotation of said plate as said tubular element moves into said generally upright position, said plate having an aperture therethrough, a plunger reciprocably mounted on said mounting element, spring means acting between said plunger and said mounting element and urging said plunger into said aperture when said tubular element is in said upright position.

3. The trailer arrangement of claim 2 wherein said means for locking said axle to said frame comprises pin mounting means adjustably mounted on said frame and adjustable toward or away from said mounting element, a pin reciprocably mounted on said pin mounting means for horizontal reciprocal movement, said axle being hollow and adapted to receive said pin for locking said axle to said frame with said further wheel in a raised position.

References Cited

UNITED STATES PATENTS

| | | | |
|---|---|---|---|
| 2,159,395 | 5/1939 | Mersereau | 280—150.5 |
| 2,205,436 | 6/1940 | Richards | 280—150.5 X |
| 2,296,789 | 9/1942 | Johnson | 280—475 X |
| 2,810,588 | 10/1957 | Rozett | 280—150.5 |
| 3,146,002 | 8/1964 | Faber | 280—475 X |
| 3,237,960 | 3/1966 | Ziegler et al. | 280—150.5 X |

LEO FRIAGLIA, *Primary Examiner.*